United States Patent [19]

Marlair

[11] Patent Number: 4,746,492
[45] Date of Patent: May 24, 1988

[54] APPARATUS FOR THE CONTROL OF HEAT ENERGY EXCHANGED WITH A FLUIDIZED BED

[75] Inventor: Guy Marlair, Douai, France
[73] Assignee: Charbonnages de France, Paris, France
[21] Appl. No.: 891,181
[22] Filed: Jul. 31, 1986

[30] Foreign Application Priority Data
Aug. 5, 1985 [FR] France .................. 85 11942

[51] Int. Cl.⁴ ............................................. F27B 15/18
[52] U.S. Cl. .................................. 422/146; 110/244; 165/104.16; 422/109
[58] Field of Search .......... 422/139, 146, 109, 200; 165/103, 35, 104.11, 104.16; 34/26, 54, 10, 57 A, 30, 43, 46; 110/244, 245; 48/76; 432/58

[56] References Cited

U.S. PATENT DOCUMENTS

| | | | |
|---|---|---|---|
| 1,660,511 | 2/1928 | Jaeger | 422/109 |
| 2,674,612 | 4/1954 | Murphree | 422/146 |
| 4,315,893 | 2/1982 | McCallister | 422/109 |
| 4,343,769 | 8/1982 | Henkelmann | 422/109 |
| 4,470,449 | 9/1984 | Ziebold | 165/103 |

FOREIGN PATENT DOCUMENTS

| | | |
|---|---|---|
| 1161722 | 7/1956 | France . |
| 1376680 | 9/1963 | France . |
| 2532411 | 3/1984 | France . |
| 58-210492 | 12/1983 | Japan .................. 165/104.16 |
| 414548 | 8/1934 | United Kingdom . |
| 1192631 | 5/1970 | United Kingdom . |

OTHER PUBLICATIONS

Patents Abstracts of Japan, vol. 8, No. 73, (M-287) [1510], Apr. 5, 1984; & JP-A-58 217 877 (Rinnai K.K.) 17.12.1983.

Primary Examiner—Barry S. Richman
Assistant Examiner—Joye L. Woodard
Attorney, Agent, or Firm—Cushman, Darby & Cushman

[57] ABSTRACT

In a fluidized bed there is immersed an internal heat-exchanger connected to a heat-transfer fluid discharge line which feeds an external heat-exchanger fitted in a fluidizing gas delivery line with a by-pass line connected to a flow-control valve so that the heat withdrawn from the fluidized bed and not used is reintroduced therein by means of the fluidizing gas.

2 Claims, 1 Drawing Sheet

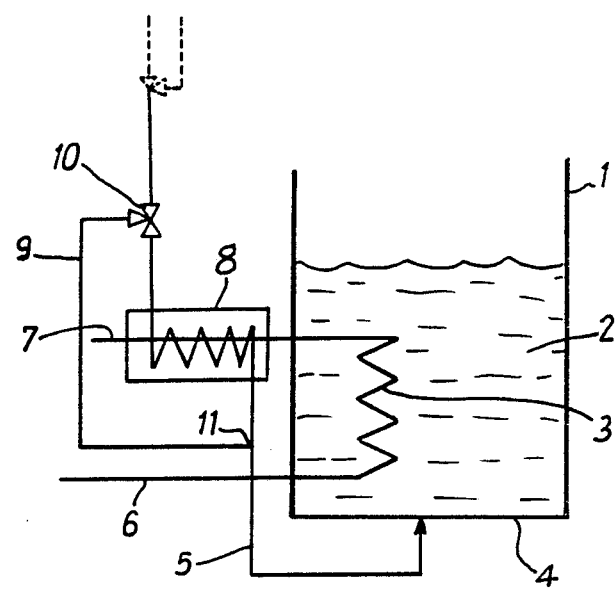

APPARATUS FOR THE CONTROL OF HEAT ENERGY EXCHANGED WITH A FLUIDIZED BED

FIELD OF THE INVENTION

The invention relates to a process and an apparatus which enable heat energy exchanged between an external medium and a fluidized bed contained in a fluidization enclosure to be easily controlled within a given range.

DESCRIPTION OF THE PRIOR ART

Fluidized beds are known to be widely employed for carrying out chemical reactions which may be endothermic or exothermic. Some reactions, such as the combination of oxygen with a fuel, are highly exothermic and are performed precisely for the purpose of using the heat flow thus produced. However, the users' needs are not constant; it is therefore necessary to control the quantity of heat obtained from the fluidized bed as a function of the required quantity of heat. Conversely, to maintain an endothermic reaction in a specified regime, the quantity of heat supplied to the fluidized bed must be controlled.

This controlled variation in the flow of heat extracted from the fluidized bed or delivered to the fluidized bed is what is also known as the flexibility of operation of the fluidized bed.

Heat exchange with a fluidized bed is generally implemented by means of a heat exchanger of the tubular type, whose tubes are immersed in the fluidized bed.

The operation of a fluidized bed may be made flexible by modifying, separately or conjointly, several factors which are, chiefly:

the fluidization velocity,
the greater or lesser expansion of the fluidized bed,
variation of the apparent density of the fluidized bed,
variation of the degree of immersion of the exchanger tubes in the fluidized bed, and
partial defluidization of the bed, produced by interruption in the supply of fluidizing gas to a part of the fluidization grid.

These factors are not wholly independent of each other. Furthermore, in many circumstances, and especially when combustion in a fluidized bed is involved, changing some of the factors is restricted by the need to maintain operationally favourable conditions if certain parameters such as the heat yield of the combustion or the quality of desulphurization of the combustion gases are to be maintained at a required value.

As a result of this, flexibility of operation is not obtained by changing a single factor but by partially changing several factors insofar as these are capable of being changed.

For example, a heat-exchanger installed in a fluidization enclosure has a constant given exchange surface area. To modify the degree of immersion of the exchanger in the fluidized bed, it is possible to alter the fluidization velocity which causes an expansion or a compaction of the fluidized bed, and this changes its height. However, changing the bed height by varying the fluidization velocity also alters the density of the bed and this gives rise to a change in the heat transfer coefficient which does not always take place in the required direction. It is also possible to change the degree of immersion of the tubes by adding or removing inert materials from the fluidized bed to alter its volume. However, this action also changes the residence time of the active solid particles in the bed, and this can be detrimental to the combustion yield. Moreover, when an exchanger is partly immersed in the fluidized bed it undergoes considerable erosion at the upper limit of this bed. It is therefore advantageous for the exchanger to be totally immersed in the fluidized bed. Its construction can then be considerably simplified.

From the foregoing it is clear, therefore, that it is useful and desirable to have access to an additional means of controlling the heat energy exchange with a fluidized bed.

BRIEF SUMMARY OF THE INVENTION

The principal aim of the invention is therefore to provide a process and an apparatus which make it possible, in addition to means which are already known and either separately or conjointly with these, to control the quantity of heat energy exchanged with a fluidized bed, chiefly but not exclusively with a fluidized bed for the combustion of a fuel in a fluidizing air stream.

Starting with a fluidization enclosure containing a reacting substance maintained in a fluidized bed state by the action of a fluidizing gas, with an internal heat exchanger at least partly immersed in this fluidized bed and carrying a heat-transfer fluid, according to the process of the invention, a controlled transfer of heat energy is produced outside the said fluidization enclosure between the fluidizing gas and the heat-transfer fluid after the latter has travelled through the internal heat exchanger.

To implement the process of the invention with a plant comprising a fluidization enclosure containing a reacting substance in a fluidized bed state, a fluidization grid, a delivery line for a fluidizing gas directed through the fluidization grid, an internal exchanger at least partly immersed in the fluidized bed and carrying a heat-transfer fluid, according to the invention this plant also comprises apparatus consisting:

(a) of an external heat exchanger fed, on the one hand, via the delivery line for the fluidizing gas and, on the other hand, by the heat-transfer fluid leaving the said exchanger, and (b) of a controllable-flow line fitted as a bypass in relation to the said external exchanger.

BRIEF DESCRIPTION OF THE DRAWING

An embodiment of the invention will now be described, by way of example only, with reference to the accompanying drawing, the single FIGURE of which shows a diagrammatic general view of an apparatus in accordance with the invention.

DETAILED DESCRIPTION OF THE PREFERRED EMBODIMENT

Referring to the drawing, there is shown an apparatus in accordance with the invention comprising a fluidization enclosure 1 contains a fluidized bed 2 in which an internal heat exchanger 3 is wholly and permanently immersed while in use. The fluidized bed 2 consists of particles of a fuel which enters the enclosure 1 via conventional feed means, not shown. This fluidized bed 2 is situated above a fluidization grid 4, through which a stream of fluidizing air is directed, also serving as primary combustion air and entering via a delivery line (i.e., duct) 5.

The heat exchanger 3 carries a heat-transfer fluid, for example water, which is delivered via a line (i.e., conduit) 6 and which leaves via a line (i.e., conduit) 7.

An external heat exchanger 8 is placed outside the enclosure 1; it is connected to line 7 downstream of the internal heat-exchanger 3, to carry preferably the entire flow of the heat-transfer fluid originating from the heat-exchanger 3. The external heat exchanger 8 is also connected to the fluidizing air delivery line (i.e., duct) 5. In addition, there is a branch line 9 which starts at a flow-control valve 10 located on the delivery line 5 upstream of the external heat exchanger 8 and which ends at a point 11 on the said delivery line 5, downstream of the external heat exchanger 8. Heat-exchanger 8 is of any suitable type capable of providing good heat transfer between the heat-transfer fluid and the fluidizing gas.

Using known means such as the control valve 10, it is possible to control in this manner the quantity of heat actually abstracted from the fluidized bed 2 while maintaining conditions which promote good combustion within the fluidized bed 2, as demonstrated by the values shown in the following table.

These values refer to a plant whose heat power capacity per unit of surface area is 2 MW/m$^2$ of surface area of the fluidization grid 4 under normal operating conditions. It is assumed that the variation in the quantity of heat exchanged with the fluidized bed 2 needs to be 50% of the power in normal operation.

| % of nominal power: i.e. MW/m$^2$ | 100% 2 | 90% 1.8 | 80% 1.6 | 70% 1.4 | 60% 1.2 | 50% 1 |
| --- | --- | --- | --- | --- | --- | --- |
| Power abstracted by the immersed exchanger (MW/m$^2$) | 1 | 1 | 1 | 1 | 1 | 1 |
| Power to be transferred to the external heat exchanger (MW/m$^2$) | 0 | 0.1 | 0.2 | 0.3 | 0.4 | 0.5 |
| Available air flow (with a constant excess of air) Nm$^3$/h | 3,300 | 3,000 | 2,665 | 2,330 | 2,000 | 1,665 |
| Air temperature at the outlet of the external heat exchanger (°C.) | 15 | 102 | 210 | 350 | 535 | 795 |

From these figures it follows that by using fluidizing air as the only means of heat transfer in the external heat exchanger 8, to extract the excess heat energy from the heat-transfer fluid and to reintroduce this energy into the fluidized bed, it is readily possible to obtain a flexibility coefficient of 1 to 1.42 (i.e. a control of operation from 70% to 100% of the nominal regime), while the temperature of the fluidizing air rises from 15° C. to 350° C. Beyond this value, heating of the fluidizing air becomes difficult to implement; this air may be diluted with an inert heat-transfer fluid such as recycled flue gases when greater flexibility needs to be obtained; it is also possible to make use of one of the additional means outlined earlier. But the process and the apparatus of the invention provides a considerable degree of flexibility which is capable of being combined with other traditional means.

I claim:

1. Apparatus for controlling heat energy exchanged between a heat-transfer fluid and a fluidization enclosure comprising: a fluidization grid, means for introducing particulate solid reactants into said enclosure above the fluidization grid, a fluidizing gas delivery duct which penetrates into said enclosure from externally thereof and is connected with said fluidization grid for directing a fluidizing gas through the fluidization grid for fluidizing said solid reactants, an internal heat exchanger at least partly immersed in the fluidized bed and carrying a heat-transfer fluid respectively delivered thereto and discharged therefrom by means of heat transfer fluid delivery and discharge ducts which respectively penetrate into and out of said enclosure from and to externally of said enclosure, said apparatus further comprising:

(a) an external heat exchanger disposed externally of said fluidization enclosure and fed, on respective sides thereof, via the fluidizing gas delivery duct upstream of said fluidization gird and, said heat transfer fluid discharge duct downstream of said internal heat exchanger, and (b) a controllable-flow duct having one end fitted with a flow-control valve in the fluidizing gas delivery duct upstream of the external heat exchanger and upstream of the fluidization grid for regulating flow of said fluidizing gas through said external heat exchanger.

2. A fluidized bed apparatus, comprising:

a bed enclosure for containing a fluidized bed of particles of fuel introduced into the enclosure;

said bed enclosure including a fluidization grid through which primary combustion air may be delivered to said enclosure for both fluidizing said fluidized bed and for oxygenating said fuel thereof for supporting combustion to take place within said bed enclosure;

a primary combustion air delivery duct extending outside said fluidization enclosure and connected with said fluidization grid for delivering primary combustion air from outside said fluidization enclosure to said fluidized bed through said fluidization grid;

a first heat exchanger comprising a conduit disposed in said bed enclosure at a site where, in use, said first heat exchanger conduit will be at least partly immersed in said fluidized bed, said internal heat exchanger conduit having an inlet end for passing a heat transfer fluid therethrough in indirect heat exchange relation with combusting fuel in said fluidized bed for gaining heat therefrom and an outlet end;

a second heat exchanger disposed outside said fluidization enclosure and having inlet means connected to the outlet end of said internal heat exchanger conduit, said primary combustion air delivery duct extending through said second heat exchanger for passing said primary combustion air in indirect heat exchange relation with said heat transfer fluid upstream of said fluidization enclosure as respects said primary combustion air but downstream of said fluidization enclosure as respects said heat transfer fluid for using some of the heat withdrawn from said fluidized bed in said heat transfer fluid for pre-heating said primary combustion air;

a branch line for said primary combustion air delivery duct, comprising a branch line duct, disposed outside said fluidization enclosure and which has an upstream end communicated with said primary combustion air delivery duct upstream of said second heat exchanger as respects said primary combustion air and which has a downstream end communicated with said primary combustion air delivery duct downstream of said second heat exchanger; and adjustable flow control valve means jointly associated with said primary combustion air delivery duct and with said branch line duct for selectively proportioning flow of primary combustion air between said primary combustion air delivery duct and said branch line duct as a means for proportioning, between said heat transfer fluid downstream of said fluidized bed and said primary combustion air upstream of said fluidized bed, the heat removed from said fluidized bed by said heat transfer fluid.

* * * * *